(12) United States Patent
Alexander

(10) Patent No.: US 7,726,669 B2
(45) Date of Patent: Jun. 1, 2010

(54) APPARATUS FOR A COLLAPSIBLE TABLE AND DOLLY

(75) Inventor: Patricia Alexander, Warren, MI (US)

(73) Assignee: Patricia Lynn Alexander, Grasse Pointe Woods, MI (US)

( * ) Notice: Subject to any disclaimer, the term of this patent is extended or adjusted under 35 U.S.C. 154(b) by 402 days.

(21) Appl. No.: 11/034,878

(22) Filed: Jan. 14, 2005

(65) Prior Publication Data

US 2006/0157944 A1 Jul. 20, 2006

(51) Int. Cl.
*B62B 1/12* (2006.01)
(52) U.S. Cl. ............................ 280/47.19; 280/47.131; 280/47.17; 280/47.24
(58) Field of Classification Search ............ 280/47.131, 280/47.16–47.19, 47.27–47.29, 47.24; 108/6, 108/7

See application file for complete search history.

(56) References Cited

U.S. PATENT DOCUMENTS

| | | | | |
|---|---|---|---|---|
| 2,784,004 A * | 3/1957 | Hamrick, Jr. | ................. | 280/30 |
| 3,064,989 A | 11/1962 | Bellows | | |
| 3,684,307 A * | 8/1972 | Bourgraf et al. | ............ | 280/654 |
| 4,049,284 A * | 9/1977 | Capper | .................... | 280/47.18 |
| 4,290,625 A * | 9/1981 | Barriere | ...................... | 280/654 |
| 4,565,382 A | 1/1986 | Sherman | | |
| 4,726,602 A * | 2/1988 | Sanders et al. | .............. | 280/654 |
| 4,865,346 A * | 9/1989 | Carlile | ........................ | 280/654 |
| 4,934,718 A | 6/1990 | Voegele | | |
| 5,161,811 A | 11/1992 | Cheng | | |
| 5,536,034 A * | 7/1996 | Miller | ......................... | 280/651 |
| 5,642,895 A * | 7/1997 | Wunder | ........................ | 280/30 |
| 5,941,175 A * | 8/1999 | Bannister | ..................... | 108/20 |
| 5,957,472 A | 9/1999 | Borgatti | | |
| 6,047,750 A * | 4/2000 | Jensen | ...................... | 144/286.1 |
| 6,053,587 A * | 4/2000 | Boerder | ................. | 312/249.12 |
| 6,328,319 B1 * | 12/2001 | Stahler, Sr. | .............. | 280/47.18 |
| 6,345,829 B1 * | 2/2002 | Mueller | .................... | 280/47.18 |
| 6,371,495 B2 * | 4/2002 | Thompson | ................... | 280/30 |
| 6,398,235 B1 * | 6/2002 | Cary | ........................ | 280/47.26 |
| 6,398,477 B1 * | 6/2002 | Fox | ............................. | 414/490 |
| 6,530,583 B1 * | 3/2003 | Mueller | .................... | 280/47.18 |
| 7,036,833 B1 * | 5/2006 | Berna et al. | .............. | 280/79.11 |
| 7,040,635 B1 * | 5/2006 | Remole | .................... | 280/47.18 |
| 7,131,155 B1 * | 11/2006 | Fernandez et al. | ............. | 5/655 |
| 7,367,571 B1 * | 5/2008 | Nichols | .................... | 280/47.18 |
| 7,377,525 B1 * | 5/2008 | Whitmore | ................ | 280/47.34 |
| 7,392,993 B1 * | 7/2008 | Prohl et al. | ............ | 280/33.998 |
| 2003/0188672 A1 * | 10/2003 | Parent et al. | ................ | 108/134 |
| 2004/0104560 A1 * | 6/2004 | Tedesco | ........................ | 280/651 |
| 2008/0302585 A1 * | 12/2008 | Perelli et al. | ................ | 180/14.1 |

* cited by examiner

*Primary Examiner*—Frank B Vanaman
*Assistant Examiner*—Vaughn T Coolman

(57) ABSTRACT

The present invention is directed to a collapsible combined table and dolly that is portable and capable of securely transporting items of various sizes and configurations. The collapsible combined table and dolly provides ease of operation through a collapsible/expandable table top and convenient means for transporting and storing items for use in the display/workspace of the table.

21 Claims, 5 Drawing Sheets

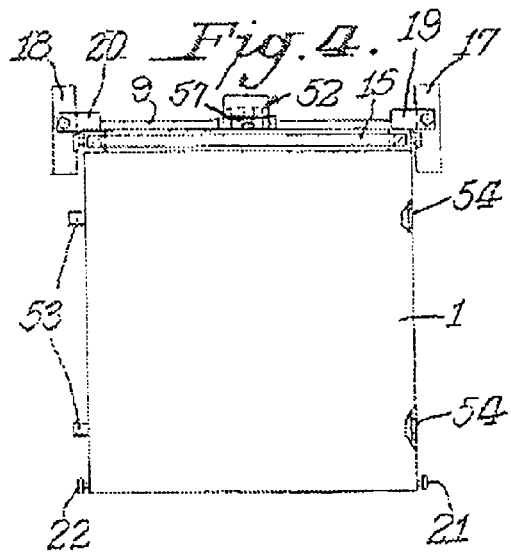
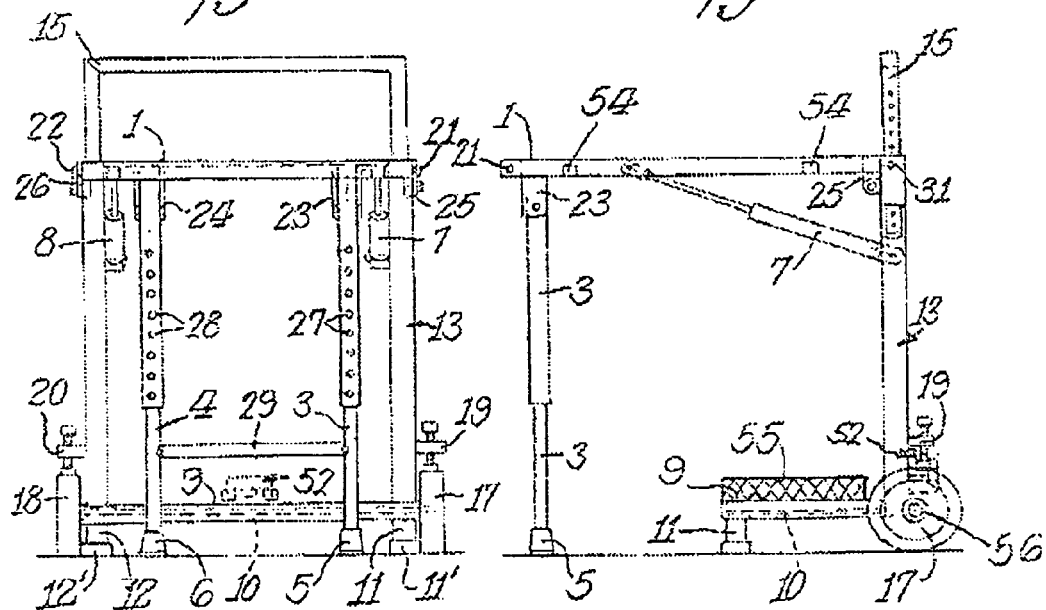

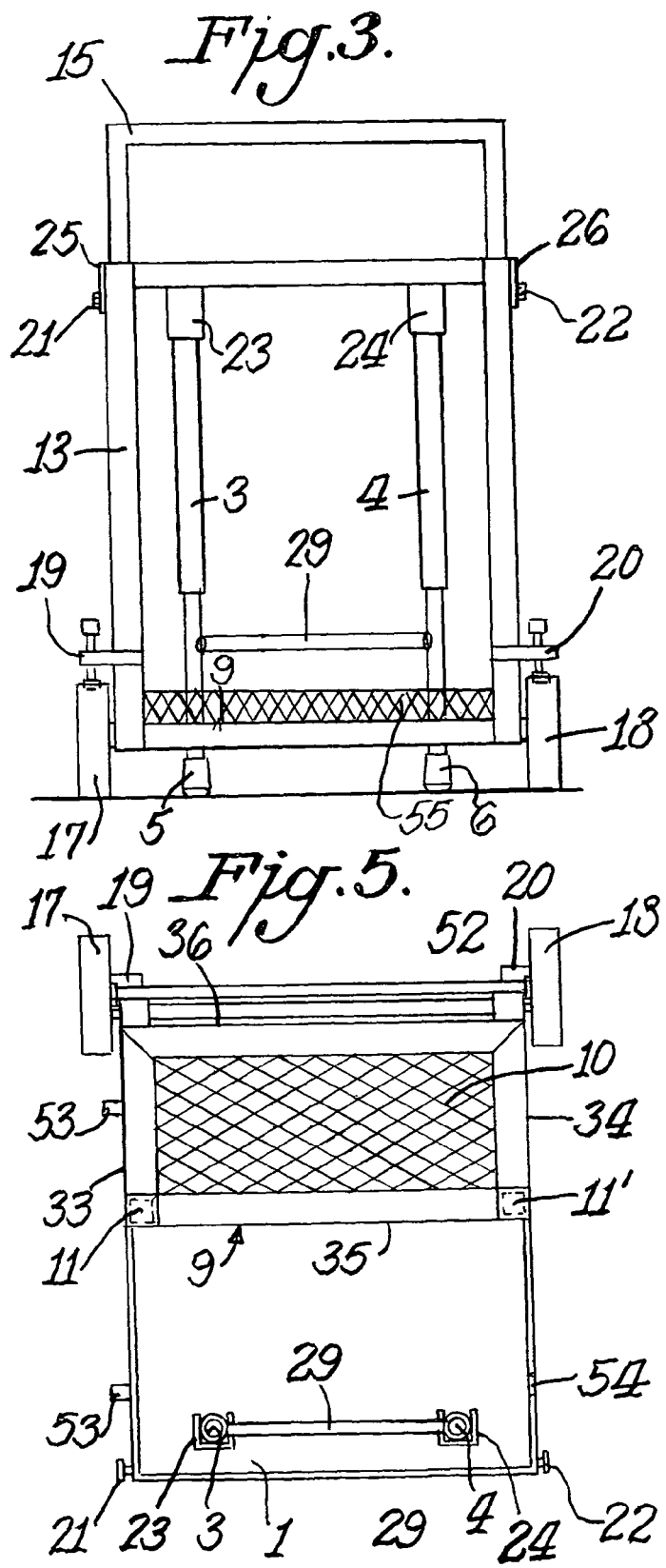

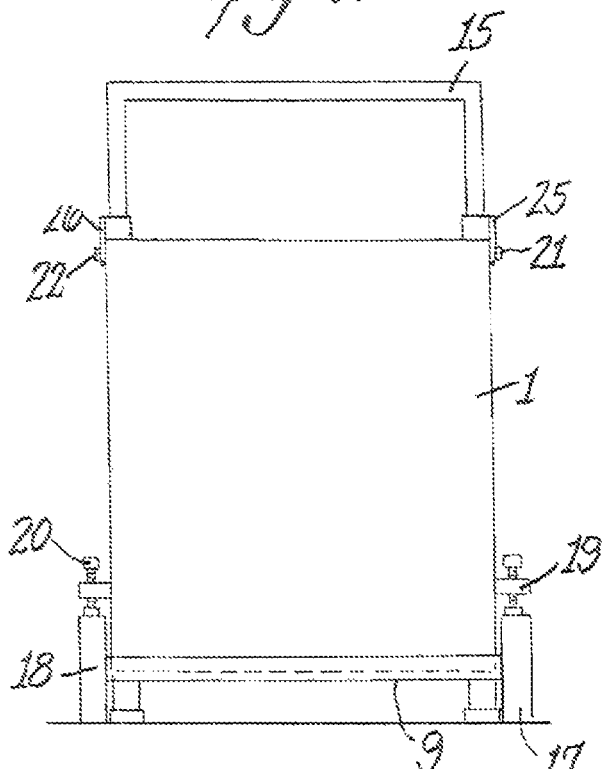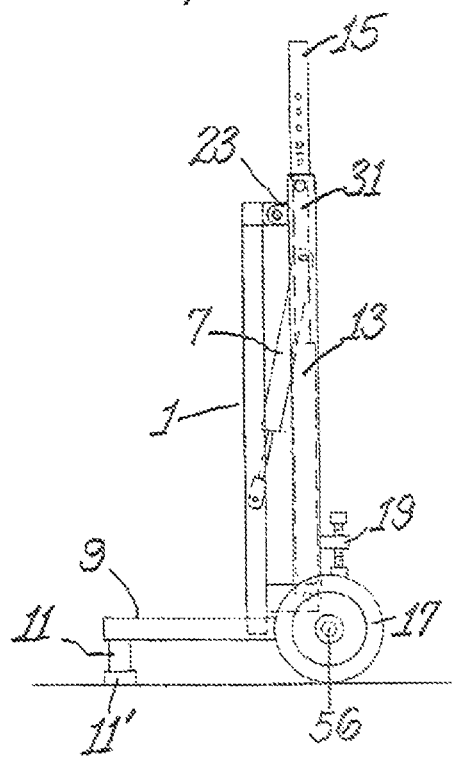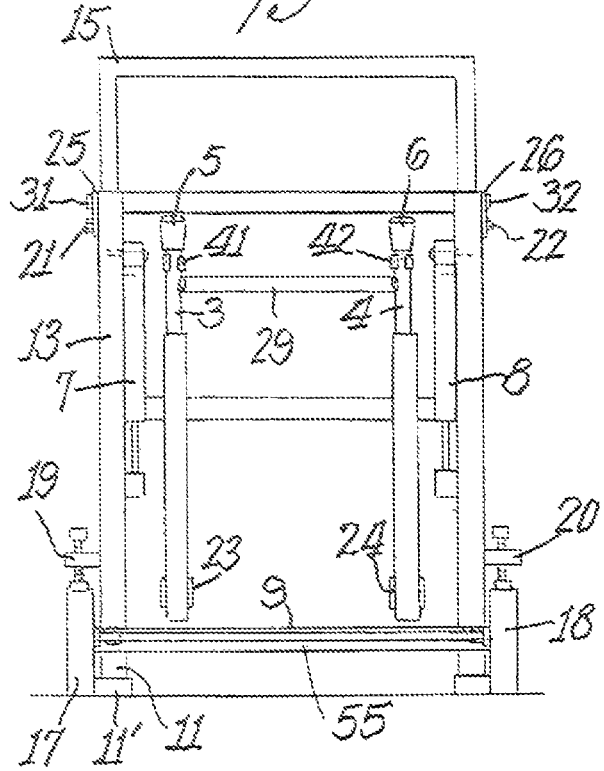

APPARATUS FOR A COLLAPSIBLE TABLE AND DOLLY

BACKGROUND OF THE INVENTION

The field of the invention is generally related to a multi-purpose portable table and hand truck or dolly of the type used for displaying and transporting items.

Multi-purpose portable tables are often utilized for both indoor and outdoor activities to provide support for displaying items or a work/play space for a wide variety of activities. However, the term "portable table" is often relative because many such tables though movable and transportable are, in fact, very difficult to transport. In addition, even when the portable table is amenable to being transported, the user often must make several trips from their original location to their destination in order to separately and individually transport items that are to be located on the workspace of the table. In order to overcome these shortcomings, background art portable tables have often been enhanced by being equipped with wheels and base plates that facilitate transporting the portable table and moving items to be used in the workspace of the table. However, further enhancements of portable tables could provide an even more user friendly portable table apparatus.

Some examples of background art in this field of invention include U.S. Pat. Nos. 4,565,382 and 4,934,718. The 382' patent is a combined portable table top 11 and hand truck 10 with an open-sided load supporting rack 28 for transporting items and with retaining means 32 for controlling the items being transported. The 718' patent is a multi-purpose hand truck 1 having an open-sided toe plate 7 for transporting items and a table top 10 for a workspace. However, the open-sided nature of the plate for transporting items of the hand trucks of the 718' and 382' patents do not allow the hand trucks of these patents to be effective for carrying small items that can not be easily restrained or that may roll and thus, need to be contained while in transport.

Other examples of the background art in this field of invention include U.S. Pat. Nos. 3,064,989 and 5,161,811. The 989' patent is a wheeled dolly 10 with a foldable supporting frame 6 having an open-sided support member 19 for transporting items when used as a dolly/hand truck. The 811' patent is a trolley/hand truck with a foldable seat 22 instead of a table top and a support frame 13 that, as in the 989' patent, provides an open-side support member for transporting items when used as a hand truck. In addition, both the wheeled dolly of the 989' patent and the trolley/hand truck of the 811' patent provide a minimal amount of supporting surface (i.e., merely the support frame members) behind the items being transported when used as a hand truck. Thus, the 989' and 811' patents have the same shortcomings as the 382' and 718' patents discussed above and additional disadvantages with regard to the limited amount of supporting surface available for use when transporting items.

Yet other examples of the background art in this field of invention include U.S. Pat. Nos. 5,957,472 and 6,371,495. The 472' patent is an apparatus 10 forming a combined hand truck and table top/machine support 16. The combined hand truck and table top of the 472' patent includes an open-sided base plate 34 for transporting items, and thus, the 472' patent has the same shortcomings as the 382', 718' and 811' patents discussed above.

The 495' patent is a table frame 60 with fold out legs 40 and a trolley 30 with a support plate 90. In contrast to the above discussed patents, support plate 90 further includes support blocks 92 which partially enclose the sides of the support plate 90. However, the 495' patent is still not effective for transporting small items that can not be easily restrained or that may roll between the openings in the support blocks.

Therefore, there is a need in the art for a combined multi-purpose portable combined table and dolly/hand truck that can be easily set-up; and conveniently move and securely transport items of various shapes, sizes and configurations from one location to another.

SUMMARY OF THE INVENTION

The present invention is directed to a collapsible combined table and dolly that is portable and capable of securely transporting items or various sizes and configurations. The present invention provides ease o1 operation through a collapsible/expandable table top and convenient means of transporting and storing items for use in the display/workspace of the table.

An embodiment of the present invention is a collapsible combined table and dolly comprising: a stand-alone support frame; a removable handle adjustably connected to an upper portion of the support frame; a table rotatably connected to the upper portion of the support frame by a first set of hinges; expandable support means rotatably connected to the table and the support frame, that gradually raise table to a horizontal open configuration or assist with closing table to a vertical stowed position; a spring-activated release/locking mechanism, connected to one side of the support frame that, when manually-activated, releases the table to be raised by the expandable supports into a horizontal position, or locks the table; when it is manually-closed in a vertical stowed position;

telescoping legs rotatably connected to the table by a second set of hinges, that when manually deployed, use pivot levers to release/lock legs at selected height with audible sound when locked; wheels rotatably connected to a back side of a lower portion of the support frame that include a spring-actuated locking mechanism for each wheel, mounted on the support frame; a four-sided dolly supporting plate with one side connected to a front side of the lower portion of the support frame;

the three remaining sides of the supporting plate are connected on each side, by hinges, to corresponding, smaller flush-mounted plates; the Three corresponding plates can be raised to a vertical position from the supporting plate, to interlock with each other and the support frame, to create a four-sided material containment box for secure transportation of goods by the combined table and dolly when table is in a stowed position; and supporting legs configured to support the dolly supporting plate.

Preferably, the handle is configured to be adjustable or can be removable to provide for a flush table surface. Further, the adjustable handle preferably includes spring loaded pins that facilitate the height adjustment or total removal of the adjustable handle. Alternatively, the adjustable handle may include manual pins with clips for height adjustment.

Preferably, the release mechanism is configured to release the table from a collapsed configuration so that the table rises to an open configuration. Further, the release mechanism is preferably foot-activated. Furthermore, the table preferably includes hydraulic or gas-charged struts as the expandable support mechanism that is configured to gradually raise the table top into the open configuration.

Preferably, the locking mechanism is foot-activated and configured to lock the wheels of the table and dolly. Further, the wheels preferably include ball bearings so the combined table and dolly can be configured for towing by a low-speed vehicle, such as a golf-cart.

Preferably, the dolly support plate further includes wire mesh that encloses the sides of the support plate. Alternatively, the support plate may include sides at least one of wire mesh panels and solid panels that can be collapsed or folded down flat and to the level of the surface plate in order to further increase the useful area of the surface plate. Further, the wire mesh is preferably configured to securely contain items while the items are being at least one of transported by the dolly and stored beneath the table. Alternatively, the dolly support plate may be made of a solid material that contains items of all sizes.

Preferably, the telescoping legs include spring loaded pins configured to provide for height adjustment of the telescoping legs. Further, the telescoping legs are preferably made of at least one of aluminum, steel and plastic. In one embodiment, the telescoping legs are connected to one another by a brace located between the telescoping legs. Moreover the telescoping legs include grips at the ends of the telescoping legs that contact the ground and leg locking braces to further stabilize the table by locking the telescoping legs into position.

Preferably, the table is made of at least one of aluminum, steel, plastic and wire mesh. Further, the table is preferably configured to support at most 150 pounds. Furthermore, the table is preferably configured to include hinges that rotate the telescoping legs into an extended position in the open configuration and clips that lock the telescoping legs in a collapsed position in a collapsed configuration.

Preferably linking pins and linking notches and or linking clips or bands can be configured to provide a secure interconnect of a first combined table and dolly to a second combined table and dolly in order to extend the size of the surface of the table. In addition, table connecting pins and notches and or linking clips or bands are used to link the tables of multiple combined table and dolly apparatus end-to-end to extend length of tables in the direction of travel and provide one contiguous table surface. Alternatively linking pins and linking notches and or linking clips or bands can be used to connect tables side-by-side to extend width.

Preferably, when the telescoping legs are retracted, the table closes into a vertical position by manual pressure until the release/locking mechanism that is configured to hold the table in the closed position is engaged.

BRIEF DESCRIPTION OF THE DRAWINGS

The invention can be described in greater detail with the aid of the following drawings.

FIG. 1. is a front elevational view of an exemplary embodiment of the collapsible combined table and dolly in an open configuration.

FIG. 2. is a right side elevational view of an exemplary embodiment of the collapsible combined table and dolly in an open configuration.

FIG. 3. is a rear elevational view of an exemplary embodiment of the collapsible combined table in an open configuration.

FIG. 4. is a top side elevational view of an exemplary embodiment of the collapsible combined table and dolly in an open configuration.

FIG. 5. is a bottom side elevational view of an exemplary embodiment of the collapsible combined table and dolly in an open configuration.

FIG. 6. is a right side elevational view of an exemplary embodiment of the collapsible combined table and dolly in a collapsed configuration.

FIG. 7. is a front elevational view of an exemplary embodiment of the collapsible combined table and dolly in a collapsed configuration.

FIG. 8. is a back elevational view of an exemplary embodiment of the collapsible combined table and dolly in a collapsed configuration.

DETAILED DESCRIPTION OF THE PREFERRED EMBODIMENT

Figure 9:
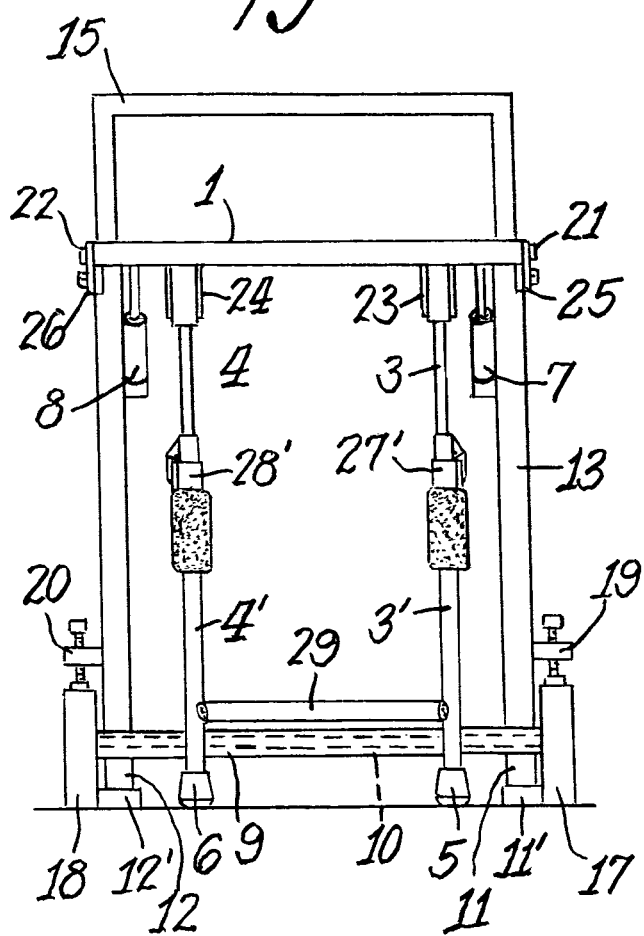
FIG. 9. is a front elevational view of an alternative exemplary embodiment of the collapsible combined table and dolly in an open configuration.

Example applications of the collapsible combined table and dolly include industrial, delivery, and construction settings as well as craft shows, flea markets, catering or other events where easily manageable display/work space is required.

FIG. 1. is a front side elevational view of an exemplary embodiment of the collapsible combined table and dolly in an open configuration. In particular, FIG. 1 shows the table 1 in the open position and supported by the telescoping legs 3, 4 and expandable supporting means 7, 8. The telescoping table legs 3, 4 are preferably made of at least one of aluminum, steel and plastic. The table 1 is attached to the support frame 13 by hinges 25, 26. The expandable supporting means 7, 8 are attached to both the table 1 and the support frame 13 and ball studs and clips. Preferably, the expandable supporting means 7, 8 are hydraulic or gas struts. The hydraulic or gas-charged struts 7, 8 are configured to gradually raise the table 1 to an open configuration. The hydraulic or gas-charged struts 7, 8 rotate on the ball studs as the table opens. Typical hydraulic or gas-charged struts may be obtained from Monroe Shocks and Struts, One International Drive, Monroe, Mich. 48161; or STRUTWISE, 14468 88 Avenue, Surrey BC V3S 2R9, Canada. An exemplary gas-charged strut is the Monroe Max-Lift® Gas-Charged Lift Support.

In addition, FIG. 1 shows the telescoping legs 3, 4 are attached to the table 1 through hinges 23, 24. The telescoping table legs 3, 4 preferably include spring loaded pins (not shown) that can be aligned using the height alignment holes 27, 28. With height alignment, the telescoping table legs 3, 4 can be configured to properly adjust the height of the table 1 in accordance with the level of the surface that each individual telescoping table leg 3, 4 is contacting. The telescoping table legs 3, 4 also preferably include grips 5, 6 at the ends that are contacting the surface. The grips 5, 6 are preferably made of rubber to provide some traction for the combined table and dolly in the open configuration.

Further, FIG. 1 shows a dolly support plate 9 that is connected to the support frame 13. The dolly support plate 9 preferably includes a wire mesh bottom 10 and wire mesh or solid sides 33, 34, 35, 36 that can enclose and contain items of various shapes, sizes and configurations that may be transported by the dolly or stored beneath the table. Alternatively, the bottom 10 of the dolly support plate 9 may be also be made of a solid materials, such as plastic, aluminum or steel, in order to prevent items that are stored or transported from falling out or off of the dolly support plate 9. In addition, the dolly support plate 9 also includes support legs 11, 12 with grips, preferably of rubber, for traction.

Furthermore, FIG. 1 shows wheels 17, 18 that make the combined table and dolly easily movable. Preferably, the wheels 17, 18 include ball bearings so the combined table and dolly can be configured for towing by a low-speed vehicle, such as a golf cart. Moreover, FIG. 1, shows locking means 19, 20 that can be, but are not limited to, foot activated. The locking means 19, 20 are configured to lock the wheels 17, 18 of the combined table and dolly when the table 1 is in use. Typical locking means can be obtained from Associated Technocrats Pvt. Ltd, A-318, Ansal Chambers-I3, Bhikaji Cama Place, New Delhi-110 066, India. An exemplary device is the DURATOOL HDTC-35 Toggle Clamp. In addition, a release/locking mechanism 52 is configured to both release the table top to an open position and secure the collapsed table top in a closed position. The release/locking mechanism 52 can be, but are not limited to, foot activated.

Figure 11:
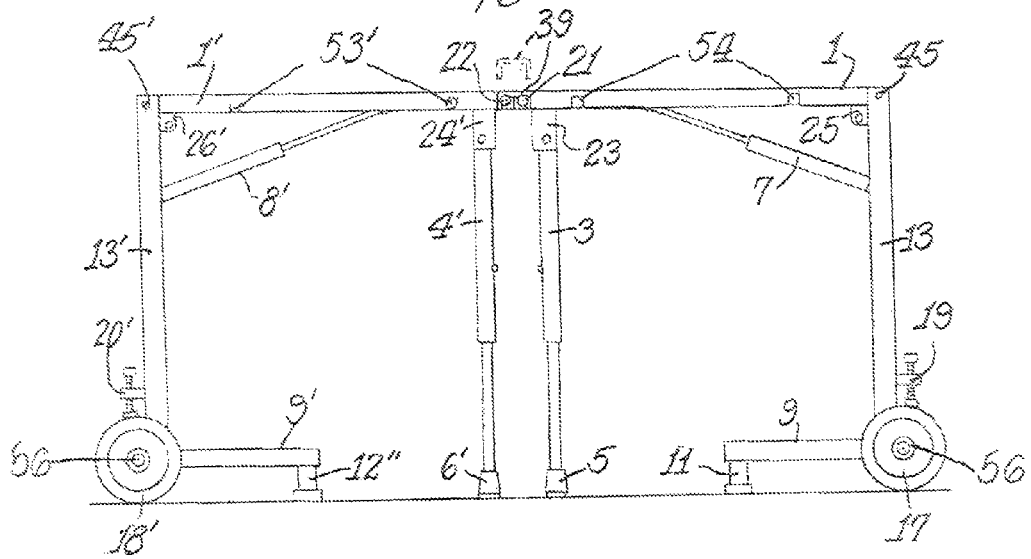
FIG. 11. is a side elevational view of an exemplary embodiment of two collapsible combined table and dolly apparatus in a linked configuration.
Figure 12:
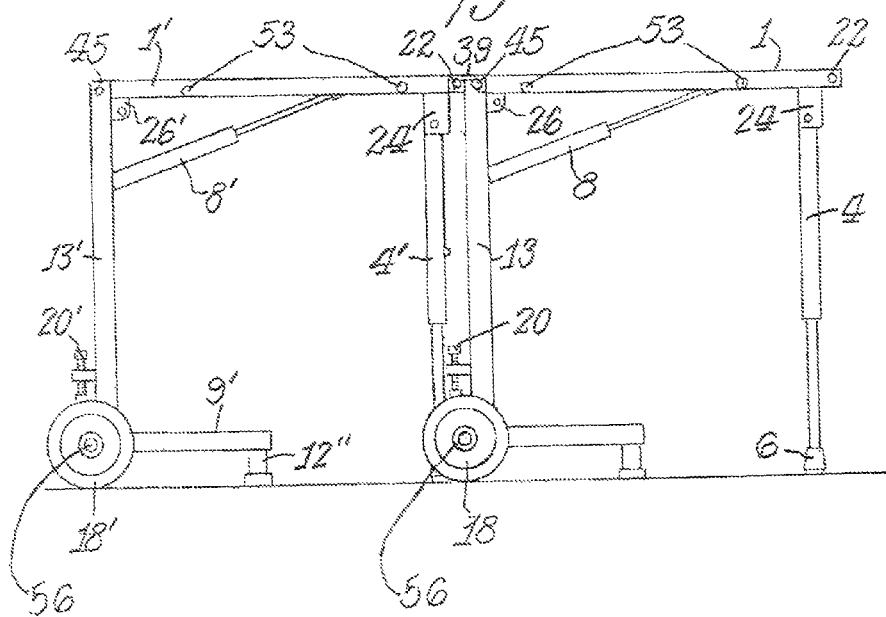
FIG. 12. is a side elevational view of an alternative exemplary embodiment of two collapsible combined table and dolly in a linked configuration.

Moreover, FIG. 1 shows table connecting pins 21, 22. Table connecting pins 21, 22 are used to link the tables 1 of multiple combined table and dolly apparatus to extend and provide one contiguous table surface by connecting tables end-to-end using a bracket to connect the pins 21, 22 and hold the tables in place. Alternatively linking pins 53 and linking notches 54 can be used to connect tables side-by-side. In an alternative embodiment, linking pins 53 and linking notches 54 may also be mounted on the ends of the table and used to connect the tables end-to-end. Various embodiments of these linked table configurations are shown in FIG. 11 and FIG. 12 and will be discussed in more detail below. In addition, pins located by the handle allow for handle height adjustment.

FIG. 2. is a right side elevational view of an exemplary embodiment of the collapsible combined table and dolly in an open configuration. FIG. 2 shows the table 1 in the open position and supported by the telescoping leg 3 and expandable supporting means 7. The table 1 is attached to the support frame 13 by hinge 25. The expandable supporting means 7 is attached by ball studs and clips to both the table 1 and the support frame 13. The telescoping leg 3 is attached to the table 1 through hinge 23. The telescoping table leg 3 also includes grip 5 at the end that contacts the ground. In addition, the support legs 11, 12 of the surface plate 9 include grips 11', 12' that contact the ground.

Further, FIG. 2 shows dolly support plate 9 is connected to the support frame 13. The dolly support plate 9 preferably includes a wire mesh bottom 10. Alternatively, bottom of the dolly support plate 9 may be also be made of a solid material.

As shown in FIG. 2, wire mesh or solid sides 55 can be folded upward and secured in a raised position to fully enclose the dolly support plate 9. Cut-outs and hooks are located in at least the corners of the wire mesh or solid sides 55 in order to easily lock and unlock the sides 55 together when folded upward to fully enclose the dolly support plate 9. The cut-outs are preferably square and the hooks are preferably L-shaped and provide an interlocking mechanism that secures the sides 55. A hinge on the wire mesh or solid sides 55 allows the sides to fold down and outward to a position flush with the surface of the dolly support plate 9. The folded down position of the wire mesh or solid sides 55 provides an expanded surface area for the dolly support plate 9. Typical foldable wire mesh sides can be obtained from Midwest Homes for Pets, Box 1031, Muncie, Ind. 47308. An exemplary wire mesh device with sides that can be folded up or down is Model 1624UL.

In addition, the dolly support plate 9 also includes support leg 11. Further, FIG. 2 shows wheel 17 with locking means 19 and notches 54 for connecting tables side-by-side. The notches 54 are matched by complimenting pins 53 located on the opposite side of the table 1.

Furthermore, FIG. 2 shows the operation of the adjustable handle 15 that is configured to include spring loaded or manual pins 29 so that the adjustable handle 15 can be at least one of adjusted in height or totally removed. The height adjustment is obtained by way of aligning the spring loaded or manual pins 29 with the height adjustment slots 31, 32. Alternatively, the adjustable handle 15 can be totally removed to provide a flush surface for the table 1.

FIG. 3. is a rear elevational view of an exemplary embodiment of the collapsible combined table and dolly in an open configuration. FIG. 3 shows the table 1 in the open position and supported by the telescoping legs 3, 4 and expandable supporting means 7, 8. The table 1 is attached to the support frame 13 by hinges 25, 26. The expandable supporting means 7, 8 are attached to both the table 1 and the support frame 13 by clips and ball studs. The telescoping leg 3, 4 are attached to the table 1 through hinges 23, 24. The telescoping table leg 3, 4 also includes grips 5, 6 at the ends that are in contact with the ground. FIG. 3 also shows adjustable handle 15, wheels 17, 18 with locking means 19, 20, and table linking pins 21, 22, and release/locking mechanism 52.

FIG. 4. Is a top side elevational view of an exemplary embodiment of the collapsible combined table and dolly in an open configuration. FIG. 4 shows the table 1 and table linking pins 21, 22, linking pins 53, and notches 54 are located near at least one of the front, rear, left and right sides of table 1. Linking pins 53 on one side of the table 1 have corresponding linking notches 54 on the opposite side of the table 1 (e.g., front-rear, left-right). Also shown in FIG. 4 are the adjustable handle 15, wheels 17, 18 locking means 19, 20, and release/locking mechanism 52 that is spring-actuated 57.

FIG. 5. is a bottom side elevational view of an exemplary embodiment of the collapsible combined table and dolly in an open configuration. FIG. 5 shows the table 1 and table linking pins 21, 22 located near the front edge of table 1. Alternatively, linking pins 53 and linking notches 54 may be used for linking tables. The telescoping legs 3, 4 are attached to the table 1 through hinges 23, 24. Also shown in FIG. 5 are the wheels 17, 18 and locking means 19, 20. Further, FIG. 5 provides a bottom view of the support plate 9 that includes a wire mesh bottom 10 with wire mesh or solid sides 33, 34, 35, 36. The front end side of the support plate 9 further includes support legs 5, 6.

FIG. 6. is a right side elevational view of an exemplary embodiment of the collapsible combined table and dolly in a collapsed configuration. FIG. 6 shows the table 1 in the collapsed position and supported with the telescoping leg 3 and expandable supporting means 7 located within the inside surface of table 1. The dolly/table 1 is supported in the collapsed position by the wheels 17, 18 and the support legs 11, 12 of the support plate 9. The collapsed table 1 is attached to the support frame 13 by hinge 25. Further, FIG. 6 shows dolly support plate 9 is connected to the support frame 13.

As shown in FIG. 6, wire mesh or solid sides 55 can be folded upward and secured in a raised position to fully enclose the dolly support plate 9. Cut-outs and hooks are located in at least the corners of the wire mesh or solid sides 55 in order to easily lock and unlock the sides 55 together when folded upward to fully enclose the dolly support plate 9.

The cut-outs are preferably square and the hooks are preferably L-shaped and provide an interlocking mechanism that secures the sides 55. A hinge on the wire mesh or solid sides 55 allows the sides to fold down and outward to a position flush with the surface of the dolly support plate 9. The folded down position of the wire mesh or solid sides 55 provides an expanded surface area for the dolly support plate 9. Typical foldable wire mesh sides can be obtained from Midwest Homes for Pets, Box 1031, Muncie, Ind. 47308. An exemplary wire mesh device with sides that can be folded up or down is Model 1624UL.

In addition, the dolly support plate 9 also includes support leg 11. Further, FIG. 6 shows wheel 17 with locking means 19, and linking pins 53 and notches 54 for connecting tables side-by-side. The notches 54 are matched by complimenting linking pins 53 located on the opposite side of the table 1.

Furthermore, FIG. 6 shows wheel 17 with locking means 19. Moreover, adjustable handle 15 is configured to include spring loaded or manual pins 29 so that the adjustable handle 15 can be at least one of adjusted in height or totally removed. The height adjustment is obtained by way of aligning the spring loaded pins 29 with the height adjustment slots 31. In addition, linking pins 53 and linking notches 54 for connecting tables are included.

FIG. 7. is a front elevational view of an exemplary embodiment of the collapsible combined table and dolly in a collapsed configuration. In particular, FIG. 7 shows the table 1 in the collapsed position and with the telescoping legs 3, 4 and expandable supporting means 7, 8 folded within the inside surface of the table 1. The telescoping table legs 3, 4 also preferably include grips 5, 6 at the ends. Further, FIG. 7 shows a dolly support plate 9 that is connected to the support frame 13. Wheels 17, 18 make the combined table and dolly easily movable and locking means 19, 20 that are configured to lock the wheels 17, 18 of the combined table and dolly when required. Moreover, FIG. 7 shows table connecting pins 21, 22, linking pins 53 and linking notches 54. Table connecting pins 21, 22, linking pins 53 and linking notches 54 are used to link the table 1 of multiple combined table and dolly apparatus to provide an extended and continuous table surface.

FIG. 8. is a back elevational view of an exemplary embodiment of the collapsible combined table and dolly in a collapsed configuration. FIG. 8 shows the telescoping legs 3, 4 and expandable support means 7, 8 folded within the inside surface of table 1. The table 1 folds down through the connection to hinges 25, 26. The table 1 is secured in the collapsed position through a release/locking mechanism 52. The telescoping legs 3, 4 fold against the table through hinges 23, 24 and are secured by clips 41, 42. The collapsed telescoping legs 3, 4 preferably include grips 5, 6 at the ends and the height of adjustable handle 15 may be determined using height adjustment holes 31, 32. Moreover, table connecting pins 21, 22, linking pins 53, and linking notches 54 are used to link the tables 1 of multiple combined table and dolly apparatus. A cross brace is used between the telescoping legs 3, 4.

Further, FIG. 8 shows a dolly support plate 9 that is connected to the support frame 13. The support plate 9 also includes support legs 11, 12 with grips 11', 12'. Wheels 17, 18 make the combined table and dolly easily movable and locking means 19, 20 that are configured to lock the wheels 17, 18 of the combined table and dolly when required.

FIG. 9. is a front elevational view of an alternative exemplary embodiment of the collapsible combined table and dolly in an open configuration. In particular, FIG. 9 shows the table 1 in the open position and supported by the telescoping legs 3', 4' and expandable supporting means 7, 8. The telescoping legs 3', 4' of the alternative embodiment further include height alignment assemblies 27', 28'. The telescoping legs 3', 4' are also connected in the alternative embodiment by crossbar element 29. The telescoping table legs 3', 4' and crossbar element 29 are preferably made of at least one of aluminum and steel. Typical telescoping legs can be obtained from Carrand Companies, Inc., 1415 West Artesia Boulevard, Rancho Dominguez, Calif. 90220. The table 1 is attached to the support frame 13 by hinges 25, 26. The expandable supporting means 7, 8 are attached to both the table 1 and the support frame 13. Preferably, the expandable supporting means 7, 8 are hydraulic or gas-charged struts. The hydraulic or gas-charged struts 7, 8 are configured to gradually release the table 1 into an open configuration. As discussed above, an exemplary device is the Monroe Max-Lift® Gas-Charged Lift Support.

In addition, FIG. 9 shows the telescoping legs 3', 4' are attached to the table 1 through hinges 23, 24. The telescoping table legs 3', 4' preferably can be aligned using the height alignment assemblies 27', 28'. With height alignment, the telescoping table legs 3', 4' can be configured to properly adjust the height of the table 1 to achieve a level table surface in accordance with the level of the surface that each individual telescoping table leg 3', 4' is contacting. The telescoping table legs 3', 4' also preferably include grips 5, 6 at the ends that are contacting the surface. The grips 5, 6 are preferably made of rubber to provide some traction for the combined table and dolly in the open configuration.

Further, FIG. 9 shows a dolly support plate 9 that is connected to the support frame 13. The dolly support plate 9 preferably includes a wire mesh bottom 10 and sides that can enclose items of various shapes, sizes and configurations that may be transported by the dolly or stored beneath the table. Alternatively, the bottom 10 of the dolly support plate 9 may be also be made of a wire mesh or solid materials such as plastic, aluminum, steel in order to prevent items that are stored or transported from falling out or off of the dolly support plate 9. In addition, the dolly support plate 9 also includes support legs 11, 12 with grips 11', 12'.

Furthermore, FIG. 9 shows wheels 17, 18 that make the combined table and dolly easily movable. Preferably, the wheels 17, 18 include ball bearings so the combined table and dolly can be configured for towing by a low-speed vehicle, such as a golf cart. Moreover, FIG. 9, shows locking means 19, 20. The locking means 19, 20 are configured to lock the wheels 17, 18 of the combined table and dolly when the table 1 is in use. Moreover, FIG. 9 shows table connecting pins 21, 22, linking pins 53 and linking notches 54. Table connecting pins 21, 22, linking pins 53 and linking notches 54 are used to link the table 1 of multiple combined table and dolly apparatus to provide one extended and contiguous table surface.

Figure 10:
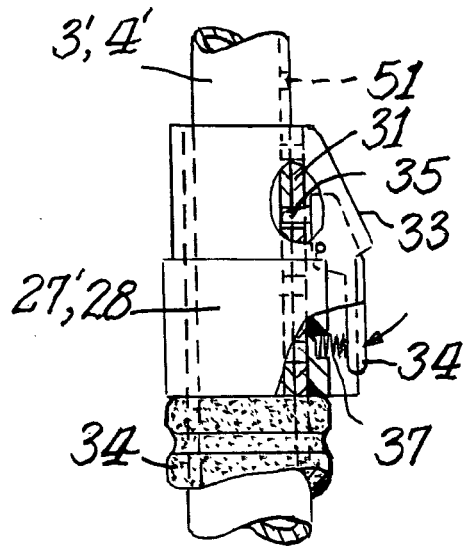
FIG. 10. is a fragmental view in elevation of the height alignment assembly of the alternative embodiment with portions broken away to show functional details.

FIG. 10. is a fragmental view in elevation of the height alignment assembly 27', 28' of the alternative embodiment with portions broken away to show functional details. FIG. 10 shows the telescoping legs 3', 4' with pin holes 51 set for predetermined height adjustments. The height alignment assembly 27', 28' includes a pivot mechanism 33 with a pin 35 for insertion into a pin hole 51 at a desired height. The pin 35 is kept in place by the pressure supplied by spring 37 against the pivot mechanism 33. When a change in the height of a telescoping leg 3', 4' is desired, the pivot mechanism 33 is pressed so as to: (1) compress the spring 37; (2) move the pivot mechanism 33 in an inward direction 34; and (3) withdraw the pin 35 from a current pin hole 51. The alignment assembly 27', 28' is then moved either up or down to locate another pin hole 51' at another desired height. Resilient surface 34 provides the user with a firm grip on the alignment assembly 27', 28' when the height adjustment is to be made. Once the other pin hole 51' at the desired height is located, the pivot mechanism 33 is released and the pin 35 is inserted in the other pin hole to set the height of the telescoping leg 3', 4'.

FIG. 11. is a side elevational view of an exemplary embodiment linking two collapsible combined table and dolly apparatus in a linked configuration. A first collapsible combined table and dolly is represented in the FIG. 11 with primed reference numbers (e.g., 1', 3', 5') in accordance with the descriptions above. A second collapsible combined table and dolly is represented in the FIG. 11 in accordance with the descriptions and the view of FIG. 2 above. A linking clip or band 39 can be used to connect the first and second collapsible combined table and dolly apparatus by connecting the linking clip or band 39 to linking pins 22 and 21, respectively. This linked table configuration allows one to combine multiple tables and extend the length of the work/display surface, as well as providing multiple storage locations beneath the tables 1, 1'. In an alternative embodiment, linking pins 53 and linking notches 54 may also be mounted on the front and rear ends of the table and used to connect the tables end-to-end. Alternatively linking pins 53 and linking notches 54 can also be used to connect tables side-by-side. Linking pins 53 and linking notches 54 can be used for connecting tables 1, 1' in a side-by-side configuration. The linking notches 54 are matched by complimenting linking pins 53 located on the opposite side of the tables 1, 1'.

FIG. 12. is a side elevational view of an alternative exemplary embodiment linking two collapsible combined table and dolly in a linked configuration. A first collapsible combined table and dolly is represented in the FIG. 12 with primed reference numbers (e.g., 1', 3', 5') in accordance with the descriptions above. A second collapsible combined table and dolly is represented in the FIG. 12 in accordance with the descriptions above. A linking clip or band 39 is used to connect the first and second collapsible combined table and dolly apparatus by connecting to linking pins 22 and 21, respectively. This linked table configuration allows one to combine multiple tables and extend the length of the work/display surface, as well as providing multiple storage locations beneath the tables 1, 1'. In an alternative embodiment, linking pins 53 and linking notches 54 may also be mounted on the front and rear ends of the table and used to connect the tables end-to-end. Alternatively linking pins 53 and linking notches 54 can also be used to connect tables side-by-side. Linking pins 53 and linking notches 54 can be used for connecting tables 1, 1' in a side-by-side configuration. The linking notches 54 are matched by complimenting linking pins 53 located on the opposite side of the tables 1, 1'.

The foregoing description illustrates and describes the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

The invention claimed is:

1. A collapsible one-piece table and dolly comprising:
a stand-alone support frame;
a handle adjustably connected to an upper portion of the support frame;
a table rotatably connected to the upper portion of the support frame by a first set of hinges;
expandable support means rotatably connected to the table and the support frame that gradually raise the table to a horizontal open configuration or assist with closing table to a vertical stowed configuration and rotate on ball studs for both the open or stowed configurations;
a spring-activated release/locking mechanism, connected to one side of the support frame that, when manually-activated, releases the table to be raised by the expandable supports into a horizontal position or locks the table when it is manually-closed in the vertical stowed configuration;
telescoping legs, rotatably connected to the table by a second set of hinges, that when manually deployed, use pivot levers to release/lock legs at selected height with audible sound when locked;
wheels rotatably connected to a back side of a lower portion of the support frame that include a spring-actuated locking mechanism mounted on the support frame for each wheel;
a four-sided dolly supporting plate with one side connected to a front side of the lower portion of the support frame;
the three remaining sides of the supporting plate are connected on each side, by hinges, to corresponding, smaller flush-mounted plates; the three corresponding plates can be raised to a vertical position from the supporting plate, to interlock with each other and the support frame, to create a four-sided material containment box for secure transportation of goods by the combined table and dolly when table is in a stowed position; and
supporting legs configured to support the dolly supporting plate.

2. The collapsible and combined table dolly of claim 1, wherein the flush-mounted plates comprise two lateral side plates of equal height and having a length, said length being less than a total length of a lateral edge of the supporting plate so as not to impede rotation of the wheels when lowered from the vertical position, along with a front plate, said front plate having a length equal to the length of a front edge of the supporting plate and a height equal to the height of said lateral sides.

3. The collapsible and combined table dolly of claim 2, wherein the the hinges that connect the flush-mounted plates to the supporting plate are limited in rotation such that said flush-mounted plates are flush with a top surface of the supporting plate when lowered from the vertical position, thereby increasing the area of the supporting plate.

4. The collapsible and combined table dolly of claim 3, wherein the sides fold up and through either clips or, by slots and matching rotating tabs, the sides can he secured together to form the three-sides of a box and the fourth side, to complete the box, is the slowed table top.

5. The collapsible combined table and dolly of claim 1, wherein the handle is configured to be at least one of adjustable and removable relative to the table.

6. The collapsible combined table and dolly of claim 1, wherein the handle further comprises spring loaded pins for at least one of adjusting a height of the handle and total removal of the handle.

7. The collapsible combined table and dolly of claim 1, wherein the handle further comprises manual pins and clips for at least one of adjusting a height of the handle and total removal of the handle.

8. The collapsible combined table and dolly of claim 1, wherein the releasing mechanism is foot-activated and spring actuated.

9. The collapsible combined table and dolly of claim 1, wherein the wheels further comprise spring-activated locking means that's foot-actuated, mounted on the support frame, to fix the position of the wheels.

10. The collapsible combined table and dolly of claim 1, wherein the wheels further comprise ball bearings configured to facilitate towing by a low-speed vehicle.

11. The collapsible combined table and dolly of claim 1, wherein the flush-mounted plates are comprised of at least one of wire mesh or solid material.

12. The collapsible combined table and dolly of claim 1, wherein the flush-mounted plates are flush to the level of the dolly supporting plate when lowered from the vertical position.

13. The collapsible combined table and dolly of claim 1, wherein the telescoping legs further include spring loaded pins configured to provide for additional height adjustment of the telescoping legs.

14. The collapsible combined table and dolly of claim 1, wherein the table can be made of wire mesh.

15. The collapsible combined table and dolly of claim 1, wherein the table is configured to support 150 pounds.

16. The collapsible combined table and dolly of claim 1, wherein the table is configured to include hinges that rotate the telescoping legs that when manually deployed, use pivot levers to release/lock legs at selected height with audible sound when locked into an extended position in open position and mounted or molded-in clips that lock the telescoping legs in collapsed, stowed position to bottom of table.

17. The collapsible combined table and dolly of claim 1, wherein with the handle removed, at least one of linking pins and linking notches or bands or clips can be configured to provide a secure interconnect of a first combined table and dolly to a second combined table and dolly in order to extend the size of the surface of the table.

18. The collapsible combined table and dolly of claim 1, wherein when the telescoping legs are retracted, the table closes into the vertical stowed configuration by manual pressure until the spring-activated release/locking mechanism that is configured to hold the table in the vertical stowed configuration is engaged.

19. The collapsible combined table and dolly of claim 1, wherein the expandable support means are at least one of hydraulic or gas-charged struts.

20. The collapsible and combined table dolly of claim 1, wherein with handles removed, a series of table/dollies can be linked together through notches and corresponding studs, or by clips or bands and corresponding studs to form one increased length or width table top.

21. The collapsible and one-piece table dolly of claim 1, wherein different table tops for specific tasks/uses could be used without sacrificing the design or interconnectability, wherein the tasks/uses are selected from the group comprising: a tool bench with bolted-on accessories; a wet sink for construction/outdoor use; multiple chamber steamer wells or a 55-gallon drum-style enclosed barbeque for catering use.

* * * * *